3,100,755
COATING COMPOSITION COMPRISING A VINYL ACETATE UNSATURATED CARBOXYLIC ACID COPOLYMER AND AN ORGANIC BASE DISSOLVED IN AN ORGANIC SOLVENT AND ARTICLE THEREWITH
Joseph R. Ehrlich, 1793 Riverside Drive, New York, N.Y.
No Drawing. Filed Apr. 13, 1959, Ser. No. 805,703
23 Claims. (Cl. 260—29.6)

My invention relates to new and improved polymeric coating lacquers or coating compositions, new and improved polymeric coating layers, and a new and improved method of making said compositions and layers.

There are certain well-known grades of copolymers of vinyl-acetate with certain unsaturated acids or anhydrides, containing four carbon atoms, such as maleic, fumeric and crotonic or isocrotonic. These grades of said copolymers react with aqueous alkalies, ammonia and amines to form water-soluble salts.

If the ratio of said unsaturated acids or anhydrides in the copolymer is kept low, say from 0.5% to .5.0% the properties and characteristics of said copolymers are much like those of vinyl acetate homopolymers. Their appearance, solubility in organic solvents, softening or melting points, excellent adhesion to all kind of surfaces, film-forming properties, insolubility in water, etc. are quite similar to those of polyvinyl acetates. Except that they can form water soluble salts, as before mentioned, a property which the polyvinyl acetates do not possess.

If the aqueous alkaline material which is being reacted with said copolymers is volatile, such as ammonia or a low boiling amine, such as methyl- or ethylamine or morpholine, such salts of the copolymers decompose again, when exposed for some time to air or when heated, and revert to the water-insoluble resin. Thus, by dissolving the resin e.g. in an ammonium hydroxide solution, it is possible to prepare an aqueous solution e.g. of the ammonium salt of said copolymer which can be used for casting a film on a surface. After a sufficient long drying time or, in a much shorter time, when heated, the ammonium salt decomposes into volatile ammonia and the original copolymer resin, which is water insoluble. Such resin films adhere strongly to surfaces of glass, metal, etc. and cannot be removed with water. They can be removed with solvents or aqueous alkalies. Aqueous solutions of the salts of said co-polymers which are formed with non-volatile alkaline materials, such as sodium hydroxide can also be used to cast a film on a surface, however, such films, after drying, are completely watersoluble.

Resins of this class can be dissolved in various volatile anhydrous amines, and the solvent can be evaporated to deposit the original resin in the original form, showing that many amines do not react with these resins, in the absence of water. These anhydrous amine solvents include morpholine, pyridine, and mono-iso-propylamine. Hence I believe that the salt formation takes place only in the presence of water.

I use resins of this class which do not hydrolyze in water. This stability to hydrolyzation in water is an important feature. I use resins of this class which can react with an alkaline material in the presence of water, to provide a water-soluble salt.

In the preferred embodiment of my invention, I dissolve a suitable starting or reactant resin of this class in an organic solvent, which is substantially neutral and which may be polar or non-polar. This solvent may be anhydrous or substantially anhydrous, preferably with not more than 5 percent of water by weight or volume. These organic solvents are exemplified by many alcohols, such as methanol, ethanol; by many esters as ethyl acetate, butyl acetate; by many ketones, such as acetone, methyl ethyl ketone; by many hydrocarbons, such as toluene, benzene; and by many chlorinated solvents, such as methylene chloride, per-chlor-ethylene.

I also dissolve in said preferably anhydrous solvent a small quantity of an organic nitrogen base, which is substantially non-volatile at 20° C.–30° C. at ordinary atmospheric pressure of 760 millimeters of mercury. The quantity of said organic nitrogen base would be insufficient to form a water soluble salt with the co-polymer, would it have been reacted with the copolymer in the form of an aqueous solution at room temperature and 760 mm. mercury pressure and in the absence of a solvent.

When the solvent is evaporated, as at 20° C.–30° C., and under said normal pressure, the solutes form a coating film on a base object, which may be made of metal, glass, plastic, and which may have a smooth surface.

This residual dry film (i.e. the film provided by the lacquer upon evaporation of the solvent) is inert to water vapor under ordinary atmospheric humidity.

However, if this residual film is wetted with water, I can easily and very quickly strip the film in shriveled form from the base object by mild rubbing or wiping or pulling. The film does not dissolve in water.

If the solution contained a sufficient amount of the dissolved organic nitrogen base to react sufficiently with the acidic resin, the wetting with water would form a salt or salt-like compound in the film, which would be watersoluble.

If the solution contains insufficient dissolved organic nitrogen base to react completely with the acidic resin, the resulting film, after wetting with water is quickly and easily strippable by mechanical action.

The residual film is insoluble in water, at least to any practical extent.

The final dry film is hydrophilic or watersensitive in each case, without being necessarily watersoluble.

The coating composition or lacquer may be free from coloring materials, or it may include pigments, and it may also include a dye or dyes which are soluble in the solvent vehicle of the coating lacquer and in the material of the residual coating film. The residual film of the new polymeric film or coating may be light-permeable or opaque. The coating composition may also include a light-filtering agent which is soluble in said solvent. This light-filtering agent becomes part of the residual coating film. I can thus form a residual film of the new polymeric material which is transparent and susbtantially colorless; or which is transparent and has any desired color; or which blocks any selected range of visible or invisible light, such as ultra-violet light in any selected range thereof; or any monochromatic visible light; or which is opaque. The coating lacquer may be supplemented with wetting agents. If the coating composition has a pigment or pigments, said composition may be supplemented with dispersing agents. I can also add dichroic staining materials such as e.g. iodine and obtain an oriented film by stretching as will be outlined later on in the specification.

As one important feature of my invention, I can produce a highly adherent, residual thermoplastic surface film upon a smooth and impervious surface of many materials, such as glass, metal, stone and plastics. This thermoplastic film is inert to water under ordinary conditions, in the absence of mechanical stripping action, such as rubbing, wiping and pulling. The film may be wettable by water. It is sufficient if the film is hydrophilic, namely, sensitive to water. The coating lacquer may contain a dissolved water-proofing agent, such as a silicone oil. In such case, if water is applied to the dry residual film, the water forms drops on said film, instead of forming a continuous film of water, as in other cases. Still, such a film can be removed after short contact with water, and mechanical stripping action. Such a film can also be removed in one piece, with slight shriveling, by flowing water upon it, without dissolving the film. Such lacquer, made with the use of a water-proofing agent, and the resultant film, are within the scope of this invention. Said resultant film, like the other films, is soluble in an aqueous solution of sodium hydroxide or other alkali, if the aqueous solution is of sufficient concentration. If the coated body is kept in a humid atmosphere, which results in condensing a thin surface film or drops of water on the exposed surface of the coating film, said coating film remains adherent and stable in all respects, in the absence of rubbing or wiping or pulling or flowing water upon it. The exposed surface of the coating film may even be wetted with a thin film of water at 20° C.–30° C., or by condensing steam thereon from boiling water which is at 100° C. In such case, the coating film remains adherent and stable in all respects, and the applied water can be evaporated by air-drying, without weakening the adherence or changing any property of the original coating film, in the absence of rubbing or wiping or pulling.

However, if the exposed surface of the coating film is wetted with water, and the wetted coating film is then rubbed, wiped or pulled, the coating film loses its adherence to the applied smooth and impervious surface of the base body so that the coating film can be easily stripped from the base body of glass, metal, stone, plastic. In such case, if not stretched, the coating film may shrivel into a string-like shape. This easy stripping of the coating film from a smooth and impervious surface is an important advantage.

It is thus possible, as one use, to coat the glass lenses of eyeglasses or glass photographic lenses with a thin transparent film of any selected color, said film being formulated to block any selected portion of the visible light spectrum or any portion of the ultra-violet light spectrum. Prescription eye-glasses can be thus easily converted into sun-glasses of any selected color and light-blocking effect. The coating is stable and adherent under ordinary conditions, but it can be easily removed or replaced by wetting and mechanical action or by alkaline aqueous solution, or by flowing water upon it in a stream. Under ordinary atmospheric conditions, the film remains dry and adherent and stable, so that the unwetted film can be wiped to remove dust without stripping said film. The coating film may be formed on glass windows, in order to filter out any selected intensity or range of sunlight. It may also be applied as a protective or ornamental coating to glass, metal, plastics and all other materials, and for many other purposes. Though such coatings may be of permanent nature they lend themselves particularly for temporary use. Tinted coatings on eye-glasses, car window shields etc. might often be desirable only for a short period, such as for the day time hours to cut out the sun glare, or during night driving to diminish the glare of the headlights of oncoming cars. For such applications organic nitrogen bases can also be used which have a very slow evaporation rate at room temperature of 20° C.–30° C. and ordinary atmospheric pressure, instead of being completely non-volatile. In such cases a slightly larger amount of nitrogen base might be added to the copolymer than needed to make the residual film strippable after contact with water, in order to allow for slight evaporation losses of the dry film.

If to such a lacquer type solution iodine is added, which completely dissolves in the solvent or solvents, a film layer can be cast from such a lacquer on a smooth surface, such as glass, cellophane etc. When said film, after the solvents have completely evaporated, is moistened with water, it becomes detachable from its base. By stripping said film from its base and simultaneously stretching it to one and a half to three times its original length, said stretched film becomes oriented and, while keeping it under tension can be transferred to another, transparent base where it is allowed to dry while kept in a stretched position. After the stretched film has dried and all water has evaporated the film adheres firmly to the new base. If the new base is a thin transparent plate or sheet the resulting lamination product polarizes light. The original copolymer without the small quantity of alkaline organic material does neither exhibit such stretchability nor such detachability from a base on which it was cast.

It is of course well-known to provide removable coatings of water-soluble polyvinyl alcohol and other materials which are applied by means of aqueous coating compositions or to use so-called strip coatings which are either applied by hot-melt dipping or spray or from solvent solution. However, they all have certain disadvantages so that they cannot be used for most of the special applications which the present invention intends to provide for. Aqueous coating compositions dry slowly whereas the improved coating compositions of this invention are of the quick-drying lacquer type and optionally and preferably of low viscosity, so that the improved liquid coating composition dries to provide the improved residual coating film as quickly as the usual nitro-cellulose lacquer, and deposits a very thin film which is not water soluble, and which can be made transparent and completely non-distorting for use on optical lenses. When a film of ordinary water-soluble material such as polyvinyl alcohol, gelatin or water-soluble cellulose ethers is formed they change their properties with the change of atmospheric conditions. They become sticky and/or soft under high humidity and brittle when dry. What is worse, they blister and even lose their adherence when dry. To remove them, when not brittle they have to be washed off with water, and when a water soluble dye-stuff was dissolved in such film, undesired staining and bleeding of the dye is unavoidable when such film is removed by washing and dissolving.

The so-called strip coatings are based on the fact that film-forming compositions are being used which have very little or no adherence at all to their base, so that they can be pulled og easily. There are certain hot-melt compositions, containing certain types of cellulose acetate butyrate or cellulose acetate which are quite viscous and form layers which are comparatively thick. If such a hot-melt gets in contact with a cold surface, as by dipping or spraying, the chilling effect causes a spontaneous shrinking effect on the contact face of the coating which prevents adhesion. Strip coatings from solvent solutions can only be made with film-forming materials of poor adhesion, such as certain unplasticized types of cellulose acetate; such coatings are necessarily very brittle and have a tendency to flake off.

The improved films of this invention, compared with the before mentioned removable films known to the present art, are inert to changes in the humidity of the atmosphere; they can be produced in very thin layers, e.g. in a thickness of one mil, or thicker or thinner, and the layer will adhere firmly to smooth surfaces when dry, and will not loosen when wet, unless pulled or rubbed; when the film is stained with dyestuffs, which necessarily have to be water-insoluble, such dyes will neither stain nor bleed when the film is being wetted for removal. The film can be removed easily at will and in undissolved form and will not get loose unvoluntarily through unfavorable atmospheric conditions.

The organic alkaline material which is added to the copolymer solution may be any nitrogen base; the limitations being only that said nitrogen base is soluble in organic solvents and is substantially non-volatile at 20° to 30° C. at a pressure of 760 mm. mercury; or, for temporary coatings which are needed only over a relatively short period the boiling point being sufficiently high and the vapor pressure being sufficiently low, so that a sufficiently large amount of said nitrogen base remains in the film for the needed period to make the coating detachable after wetting with water, without making it necessary to add so much nitrogen base that the coating might become water-soluble. That is normally true for bases with a boiling point of 250° C. or more at 760 mm. mercury pressure. The substantially non-volatile nitrogen bases are solids, or liquids with boiling points of 300° to 360° C. at atmospheric pressure of 760 mm. mercury. Bases which are even sparingly soluble in organic solvents may be used, as only very small quantities are needed. Such nitrogen bases can be primary, secondary or tertiary amines, and they may be aliphatic, aromatic or heterocyclic compounds, including hydroxyl amines and hydrazines, and they may contain alkyl, aryl, hydroxyl or other groups or radicals; they may contain more than one amino group or they may be quarternary ammonium bases. All these classes are repeatedly exemplified by the following compounds which have been found to be operable:

Triethylene tetramine; tetraethylenepentamine; polyglycolamine H–163

($HO.CH_3CH_2OCH_2CH_2OH_2CH_2CH_2NH_2$)

tetradecylamine; dioctylamine; didecylamine; 5-isopropylamino-1-pentanol; di(2-ethylhexyl) amine; diethanolamine; diisopropanolamine; triisooctylamine; triethanolamine; di(2-ethylhexyl) ethanolamine; triisopropanolamine; butyldiethanolamine; meta-amino phenyl methylcarbinole; kylidine; α-naphthylamine; β-naphthylamine; p-phenylenediamine; benzidine; phenylhydrazine; acetoacetanilide; aceto acet ortho anisidide; aceto acet ortho toluidide; aceto acet ortho xylidide; diphenylamine; N,N-dibutyl aniline; amine 220

($C_{17}H_{33}C:NC_2H_4NC_2H_4OH$)

phenyldiethanolamine; phenyl ethyl ethanolamine; trimethylphenyl ammonium hydroxide; diphenyl hydrazine; tetraethyl tetrazine; amylaniline; N-phenyl morpholine; hexamethylenetetramine; phenazine; aminophenazine; diaminophenazine; naphthazine; anthrazine

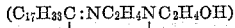
($C_{14}H_8N_2C_{14}H_8$)

iminazol or glyoxalin; 1,2,4 triazole; 5-amino tetrazole; quinaldine; α-hydroxyquinoline; quinine; quinidine; papaverine; narcotine; antipyrine, etc. etc.

It is well known that copolymers of vinylacetate with crotonic acid or maleic acid, copolymerized in the before mentioned ratios dissolve in an excess of aqueous solutions of alkalies, ammonia or certain water soluble amines, to form water soluble salts.

In the U.S. Patent No. 2,698,316 it has also been disclosed to react certain amines with the copolymeric reaction products of alpha, beta-unsaturated polycarboxylic acids, in particular, maleic acid, with aliphatic vinyl compounds, in particular, vinyl acetate. According to said disclosure copolymers are being used which are obtained by reacting equimolar quantities of the monomers. The amines with which said copolymers are reacted are saturated primary and secondary aliphatic higher amines containing from 8 to 18 carbon atoms, in particular, an average of 14 carbon atoms. One to two moles of aliphatic primary or secondary amine are reacted with one mole of the unsaturated polybasic acid or anhydride in the copolymer. Expressed in ratios of amine to copolymer, as given by the examples in U.S. Patent 2,698,316, said ratios are from 200 to 285 parts per weight of amine to 100 parts of copolymer. The reaction between amine and copolymer takes place in a suspension of toluene or xylene at temperatures between 100° C. to 200° C. under reflux and the reaction time is from 1 to 5 hours. The reaction products, after the solvents have been removed, are mostly oils, are all soluble in mineral oils and are being used as pour point depressants and viscosity index improvers for lubricating oils.

The coating compositions of my invention are entirely different from the above mentioned products which are presently known to the art. The copolymers which I use for the purpose of my invention contain only from 0.5 to 5.00% of an unsaturated acid containing four carbon atoms, exemplified by crotonic acid, isocrotonic acid, fumaric acid and maleic acid; their respective anhydrides for the purpose of this invention being considered equivalent to the acids. I prefer to use a copolymer of 97% vinyl acetate and 3% crotonic acid. I can use such copolymers with a molecular weight ranging from 22,000 to 60,000 with a preferred range of 25,000 to 40,000, and particularly of around 28,000.

I can use any nitrogen base with a basic character, from mild to strong bases, which are solid, or liquid and substantially non volatile at temperature of 20° C. to 30° C. at an atmospheric pressure of 760 mm. mercury, and which are sufficiently soluble in organic solvents; sufficiently soluble in organic solvents for the purpose of this invention means a solubility of not less than 1 part in 100 parts solvent at 20° C. Such nitrogen bases are not limited to primary or secondary amines, neither to aliphatic compounds. Of many hundreds of nitrogen bases which I can use and which are within the given limitations, 52 examples have been listed to represent at least the most important classes of such nitrogen bases.

I dissolve said copolymers and nitrogen bases at room temperature of 20° C. to 30° C. and under normal atmospheric pressure in organic solvents, preferably blended to provide for a quick drying lacquer which deposits a smooth, non-blushing, residual coating. The ratio of such nitrogen base might be from 0.5 part to 10 parts by weight to 100 parts of copolymer; however, the average will be about 1 to 2 parts nitrogen base to 100 parts by weight of copolymer. No heating takes place to react the components. After evaporation of the solvent the residue is a film forming resin which is substantially insoluble in water and mineral oil. However, the properties of the original copolymer have changed in the residual resin.

Though the amount of nitrogen base is insufficient to possibly form a watersoluble salt with the copolymer in the presence of water it might be that a fraction of copolymer has arranged itself with the nitrogen base to form a latent compound which is uniformly dispersed in the solvent solution; after evaporation of the solvent such "latent" particles might be uniformly dispersed in the remaining "unreacted" part of the copolymer to react in contact with water to form a water-soluble salt which is sparingly, but uniformly interspersed in the water insoluble residue. However, I do not known whether this theory is right or whether a new compound has been formed. There are a number of considerations which are for and against either one of those theories and a confirmation will have to wait until additional investigations will produce new facts.

However, whatever the correct explanation might be, the new product is a truly new and useful product. It has been established that films cast from this solution onto smooth, inert surfaces, after being brought into short contact with water, loose temporarily their strong bond with the base surface and can be easily removed by wiping, pulling, stripping etc. They become temporarily soft and extremely stretchable. They do not dissolve in water. When the coating solution is poured into water or carefully cast onto the surface of the water a precipitation takes place; the same soft, stretchable material forms strings in the water or a film on the surface of the water, respectively. A number of practical applications of these properties have already been described.

The choice of the solvent vehicle also influences the detachability of the film from certain base materials. Thus, if the base material which is to be coated, is inert to organic solvents, such as glass, metal, stone, polyethylene, the film is easily detachable by applying water, combined with mechanical stripping action, irrespective of the organic solvent vehicle.

However, if the base material is sensitive to certain organic solvents, such as base materials which are made of polystyrene, methyl methacrylate, cellulose acetate, nitrocellulose, polyvinyl acetate, polyvinyl chloride, and other plastics or resins, the single or mixed solvent vehicle of the coating lacquer or composition may optionally be free from solvent to which said base material is sensitive. The solvents which attack plastics, especially thermoplastic plastics, are usually esters, ketones, aromatic hydrocarbons, and chlorinated hydrocarbons. Most plastics are inert to alcohols and to straight-chain hydrocarbons. Hence if the base material is a plastic, alcohols and straight-chain hydrocarbons can be used as solvents in the coating compositions, or as diluents therein. The solvent vehicle of the coating composition may consist in whole or in part of alcohols. It is undesirable for some purposes to use a coating composition whose solvent attacks the base material if a strippable film is desired, because this prevents easy removal of the film. Also, in such case, if the coating composition includes a dissolved dye, such dye will stain the base material. However, the invention is not limited to any solvent vehicle or to a strippable film.

If the solvent vehicle is a mixture which has a major proportion by volume or weight, or both by volume and weight, of an alcohol or alcohols, said solvent vehicle may have a minor proportion of ketones, esters, aromatic hydrocarbons or chlorinated hydrocarbons. In such case, there is no substantial effect on a plastic which is inert to the alcohol or alcohols, so that the film can be easily stripped by applying aqueous soap solution with combined mechanical action, if an easily strippable film is desired. In such case, part of the alcohol or alcohols can be replaced by straight-chain hydrocarbons to which the plastic is inert. The color, gloss and other surface characteristics of the plastic are thus unaffected by the application of the film and its removal.

If a larger amount of nitrogen base is dissolved than necessary to make the residual film strippable by application of water, without dissolving said film in water, there is also a latent reaction product formed in the organic solvent solution. In that case, the latent reaction product in said residual film will become water soluble and will dissolve after staying immersed in water for some time.

It would lead unduly far to give examples of every possible or even desirable or useful variation of these new and improved coating compositions. The following few examples shall therefore serve only as a sample demonstration as to how such coating compositions can be made. However, the scope of this invention is by no means limited to the examples, and it is emphasized that virtually hundreds of different nitrogen bases as previously described can be combined with any one of the described acid copolymers. Likewise, the solvents may greatly vary, depending on the end use of the coating solutions, and the addition of additives is optional in any individual case. Such additives can be any one of suitable commercial wetting or dispersing agents, pigments, dye-stuffs or other organic or inorganic staining agents, filtering agents for any band of the spectrum, perfumes, plasticizers etc.

*Example 1*

The solvent or solvent vehicle is as follows; the proportions of its ingredients being by volume:

| | Percent |
|---|---|
| Methanol | 20 |
| Isopropanol | 50 |
| Methyl ethyl ketone | 15 |
| n-Butyl acetate | 15 |

This solvent is anhydrous or substantially anhydrous. The coating composition, in parts by weight, consists of the following:

(A) 89% of said solvent
(B) 10% of copolymer
(C) 0.15% triethanolamine
(D) 0.35% yellow dyestuff
(E) 0.50% blue dyestuff The copolymer (B) is made of 97% vinylacetate and 3% crotonic acid and has an approximate molecular weight of 28,000; this copolymer is hydrophobic and does not hydrolyse in water;

The yellow dyestuff (D) is manufactured and sold by the National Aniline Division of Allied Chemical and Dye Corporation New York, N.Y., under the name of Oil Yellow 3 G; this is a disazo dye, Colour Index 2nd edition, number 21,230, also known as Colour Index Solvent Yellow 29;

Its formula is given in the Colour Index as follows:

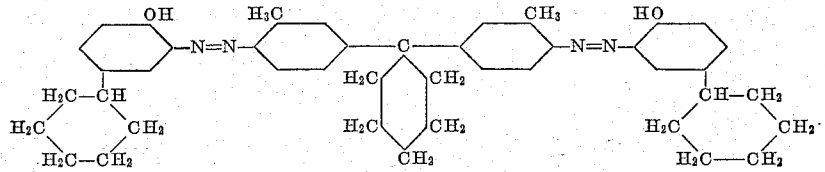

The blue dyestuff (E) is a 1,4 dialkyl amino anthraquinone derivative which is described in U.S.P. 2,211,943; it is known as Brilliant Oil Blue BMA and manufactured by the Natl. Aniline Div. Allied Chem. & Dye Corp.

Ingredients (B) (C) (D) (E) are added in succession to Ingredient (A), as at 20°–30° C,, with proper stirring. It is noted that the weight of the triethanolamine is 1.5% of the weight of the reactant resin (B). The concentration of the reactant amine is 0.15%.

This coating composition may be filtered, if necessary. It provides a transparent final, thin film of uniform thickness, which has a green color. This coating composition may be applied by brushing, dipping, spraying, etc. to an object made of clean glass and other nonporous materials, at 20° C.–30° C. The mixed solvent is allowed to evaporate at 20° C.–30° C. in air at said normal atmospheric pressure. This film has good adherence to a clear surface of glass, metal, stone, plastics and other non-porous materials.

When this film is wetted with water the film absorbs water, because the film is now hydrophilic. However, the wetted film remains stable and adherent in the absence of mechanical stripping action. Light rubbing, wiping or pulling, easily strips the film. After a short redrying period, the dry film cannot be stripped by mechanical action. The film is substantially insoluble in water at 20° C.–30° C.

*Example 2*

The solvent vehicle or solvent is as follows, the proportions being by volume:

| | Percent |
|---|---|
| n-Butanol | 17 |
| Xylene | 15 |
| Cellosolve (glycol monoethyl ether) | 38 |
| Methanol | 10 |
| Isopropanol | 10 |
| Isobutanol | 10 |

The solvent is anhydrous or substantially anhydrous. The coating composition in parts by weight consists of the following:

| | Percent |
|---|---|
| (F) Solvent | 91.0 |
| (G) Co-polymer | 8 |
| (H) Tetraethylenpentamine | 0.1 |
| (I) Orange dyestuff | 0.9 |

The co-polymer (G) is made of 98.5% vinyl acetate and 1.5% maleic acid; its molecular weight is approximately 40,000.

The orange dyestuff is a xanthene dye, Colour Index Number (2nd Ed.) 45,456; it is also known as C & D orange No. 14. Its formula is given in the Amer. Journ. of Pharm. Sept. 1942 as follows:

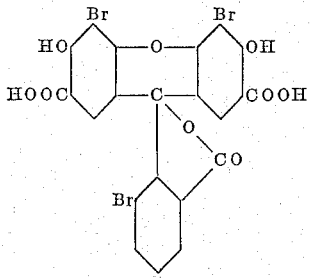

This composition is prepared as in Example No. 1. In this case, the weight of the nitrogen base is 1.25% of the weight of the acid resin (G). The concentration of the basic reactant is 0.1% of the weight of the coating composition.

Properties and applications same as in Example 1.

*Example 3*

The solvent vehicle or solvent is as follows, the proportions of its ingredients being by volume:

| | Percent |
|---|---|
| Xylene | 7 |
| Toluene | 35 |
| Isopropanol | 30 |
| n-Propanol | 2 |
| n-Butanol | 1 |
| Methanol | 25 |

The solvent is anhydrous or substantially anhydrous. The coating composition, in parts by weight, consists of the following:

| | Percent |
|---|---|
| (J) Solvent | 86 |
| (B) Co-polymer | 11 |
| (L) Meta-amino phenyl methyl carbinol | 0.6 |
| (M) Blue dyestuff | 1.25 |
| (N) Ultraviolet absorber | 1.15 |

The co-polymer (B) is the same as in Example 1. The blue dyestuff (M) is Victoria Blue 4R base, a triarylmethane C.I. No. 42,563B (Solvent Blue 2) with the following formula:

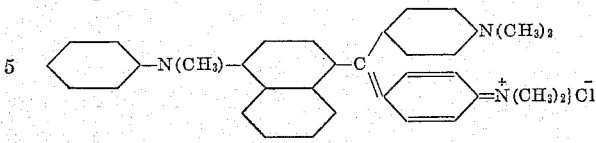

The ultraviolet absorber (N) is 2,4 dihydroxy benzophenone. The method of preparation is as in Example 1. This composition can be used to form a film on any non-porous surface, including many plastics. In this example, the weight of the nitrogen base is about 5.4% of the acid resin.

*Example No. 4*

The solvent vehicle or solvent is as follows, the proportions of its ingredients being by volume:

| | Percent |
|---|---|
| n-Butyl alcohol | 17 |
| Xylene | 15 |
| Cellosolve (glycol mono ethyl ether) | 38 |
| Methanol | 10 |
| Isopropanol | 10 |
| Isobutylalcohol | 10 |

The solvent is anhydrous or substantially anhydrous. The coating composition, in parts by weight, consists of the following:

| | Percent |
|---|---|
| (F) Solvent | 78 |
| (B) Co-polymer | 11 |
| (C) Triethanolamine | 1 |
| (G) Co-polymer | 5 |
| (O) Dibutyl phthalate | 2.5 |
| (P) Iodine | 2.5 |

Copolymer (B) is the same as in Example 1; Co-polymer (G) is the same as in Example 2. The preparation is the same as in Example 1.

If this solution is cast on a clean glass plate and the solvent is allowed to evaporate, the remaining dry film is transparent and has a light brown color. If said film is wetted with water it can be lifted from the glass plate and at the same time be stretched. When stretched to about 2½ times of its original length the stretched, soft film can be transferred to another glass plate. It dries within a short time while kept in the stretched position and now adheres firmly to the transferred glass plate. The film is still transparent and the color has changed to a light, pinkish yellow. This film now polarizes light. If two such films are superimposed with the stretched dimensions parallel to each other incident light can pass through both films. If one film is rotated gradually up to 90 degrees incident light is gradually extinguished; the light extinction reaches a maximum when the films are crossed at 90 degrees. Instead of transferring the stretched film to glass, it can be transferred to a transparent plastic sheet, and the stretched film can also be sandwiched between two transparent sheets. Instead of using two different co-polymers I can use only one in the above formulation.

*Example 5*

The solvent vehicle or solvent is as follows, the proportions of its ingredients being by volume:

| | Percent |
|---|---|
| Ethyl acetate | 2 |
| iso-Amylacetate | 3 |
| n-Butyl acetate | 12 |
| Methyl ethyl ketone | 12 |
| Methyl iso-butyl-ketone | 3 |
| Methanol | 8 |
| Ethanol | 10 |
| Isobutyl alcohol | 10 |
| Isopropanol | 30 |
| Secondary butyl alcohol | 10 |

The solvent is anhydrous or substantially anhydrous. The coating composition, in parts by weight, consists of the following:

| | | Percent |
|---|---|---|
| (Q) | Solvent | 87.0 |
| (B) | Co-polymer | 10.0 |
| (S) | 1-amino tetradecane | 0.2 |
| (T) | Blue dyestuff | 0.4 |
| (U) | Black pigment | 2.4 |

The co-polymer (B) is the same as in Example 1. The blue dyestuff (T) Calcogas Blue NA, an anthroquinone dyestuff made by the Calco Chem. Division of the American Cyanamid Corp. of New York. C. I. No. 61555, also C. I. Solvent Blue 14, also known as D & C Blue No. 5. The formula is as follows:

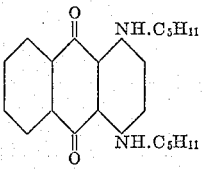

The pigment (U) is carbon black.
The addition of a commercial dispersing agent is optional.

The soluble ingredients (R) (S) (T) are added to and dissolved in the solvent (Q) in the above-named succession. The pigment (U) is then dispersed in the solution.

The residual film is translucent to opaque, depending on its thickness. Like the other films, it can be stripped after being wetted with water.

The improved films can be thus used to provide colorless or colored protective films for storing and shipping various articles and materials.

As one illustration, a glass lens which had a dry coating made according to Example No. 1, was immersed in water at 20° C.–30° C., under normal atmospheric pressure of 760 millimeters of mercury. No perceptible solution of said film in the water was observed at the end of an immersion period of one hour.

The thickness of the film may be from one micron to eighteen microns, with a preferred range of nine microns to fourteen microns. Thicker films may be formed by increasing the solid content and viscosity of the lacquer.

I have described preferred embodiments of my invention, but numerous changes, omissions, additions and substitutions can be made without departing from its scope.

This application is a continuation-in-part of my application Serial No. 503,034, filed April 21, 1955.

I claim:

1. A liquid coating composition which is a lacquer characterized in that the firm provided thereby upon evaporation of the solvent thereof is insoluble in water and after contact with water is strippable by mechanical action from asurface protected thereby, said composition comprising, as the lacquer solvent, a volatile organic and substantially anhydrous solvent, a resin dissolved in said solvent, and an organic nitrogen base dissolved in said solvent, said resin being a co-polymer of vinylacetate and an unsaturated carboxylic acid containing a total of four carbon atoms and selected from the group consisting of maleic, fumaric, crotonic and isocrotonic acid, said resin containing from 95% to 99.5% vinylacetate groups and from 0.5% to 5% of said carboxylic acid groups, said organic nitrogen base being substantially non-volatile at 20° C. to 30° C. under normal atmospheric pressure of 760 millimeters of mercury said nitrogen base being 0.5 part to 10 parts by weight to 100 parts by weight of said co-polymer.

2. A coating composition according to claim 1, in which said resin is a co-polymer of vinylacetate and crotonic acid.

3. A coating composition according to claim 1, in which said resin is a co-polymer of vinyl acetate and isocrotonic acid.

4. A coating composition according to claim 1, in which said resin is a co-polymer of vinylacetate and maleic acid.

5. A coating composition according to claim 1, in which said resin is a co-polymer of vinyl acetate and fumaric acid.

6. A coated object, said object having a coating which is a film formed from a composition according to claim 1.

7. A coated object, said object having a coating which is a film formed from a composition according to claim 2.

8. A coated object, said object having a coating which is a film formed from a composition according to claim 3.

9. A coated object, said object having a coating which is a film formed from a composition according to claim 4.

10. A coated object, said object having a coating which is a film formed from a composition according to claim 5.

11. A transparent coated sheet, said sheet having a dichroicly stained coating or layer which is a film provided by a lacquer of a composition according to claim 1, said coating being oriented by stretching said coating while in the water-moistened, detached state, said coated sheet having light-polarizing properties.

12. A coating composition according to claim 1, in which the weight of said resin is 10 to 100 times the weight of said nitrogen base.

13. A liquid coating composition which is a lacquer characterized in that the film provided thereby upon evaporation of the solvent thereof is insoluble in water and after contact with water is strippable by mechanical action from a surface protected thereby, said composition comprising, as the lacquer solvent, a volatile organic solvent containing less than 5% water, a resin dissolved in said solvent and an organic nitrogen base dissolved in said solvent, said resin being a co-polymer of vinylacetate and an unsaturated carboxylic acid containing a total of four carbon atoms and selected from the group consisting of maleic, fumaric, crotonic, and isocrotonic acid, and being non-hydrolyzable in water, said resin containing from 95% to 99.5% vinylacetate groups and from 0.5 to 5% of the carboxylic acid groups, said nitrogen base being 0.5 part to 10 parts by weight to 100 parts by weight of said co-polymer, said organic nitrogen base being substantially non-volatile at 20° C. to 30° C. under normal atmospheric pressure of 760 millimeters of mercury, and being soluble in said solvent in amount of at least 1 part of nitrogen base in 100 parts of solvent.

14. A coating composition according to claim 13, in which said resin is a co-polymer of vinyl acetate and crotonic acid.

15. A coating composition according to claim 13, in which said resin is a co-polymer of vinyl acetate and isocrotonic acid.

16. A coating composition according to claim 13, in which said resin is a co-polymer of vinyl acetate and maleic acid.

17. A coating composition according to claim 13, in which said resin is a co-polymer of vinyl acetate and fumaric acid.

18. A coated object, said object having a coating which is a film formed from a composition according to claim 13.

19. A coated object, said object having a coating which is a film formed from a composition according to claim 14.

20. A coated object, said object having a coating which is a film formed from a composition according to claim 15.

21. A coated object, said object having a coating which is a film formed from a composition according to claim 16.

22. A coated object, said object having a coating which is a film formed from a composition according to claim 17.

23. A transparent coated sheet, said sheet having a dichroicly stained coating or layer which is a film provided by a lacquer composition according to claim 13, said coating being oriented by stretching said coating while in the water-moistened, detached state, said coated sheet having light-polarizing properties.

References Cited in the file of this patent

UNITED STATES PATENTS

| | | |
|---|---|---|
| 2,562,852 | Baer | July 31, 1951 |
| 2,698,316 | Giammaria | Dec. 28, 1954 |
| 2,806,020 | Scott et al. | Sept. 10, 1957 |